Patented Sept. 21, 1948

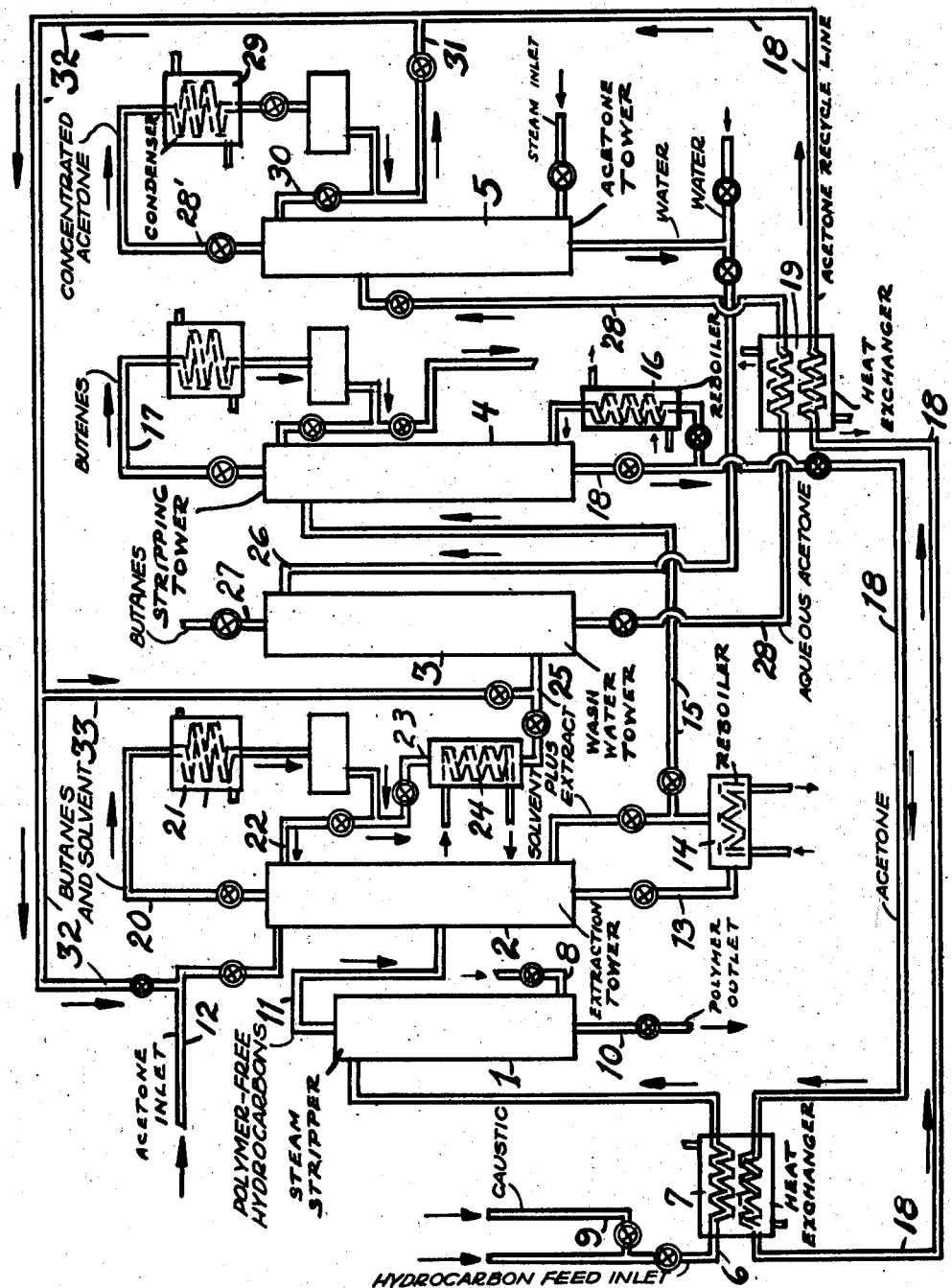

2,449,610

UNITED STATES PATENT OFFICE 2,449,610

EXTRACTIVE DISTILLATION OF BUTANES AND BUTENES WITH ACETONE SOLVENT

John D. Long, Westfield, N. J., assignor to Standard Oil Development Company, a corporation of Delaware Application April 1, 1943, Serial No. 481,403

5 Claims. (Cl. 202—39.5)

This invention relates to a method of separating hydrocarbons, and more particularly, to a process for the extractive distillation of paraffins from olefins employing a solvent in the liquid phase whereby the olefins are concentrated in the residue.

The accompanying drawing is a front elevation in diagrammatic form of a plant suitable for carrying out the process according to the present invention. The plant illustrated is adapted for the operation of the process of the present invention in its preferred embodiment. It will be understood from the description of this plant that various changes may be made therein to modify the process as described without departing from the spirit and scope of this invention.

It is known to separate various hydrocarbon mixtures by fractionating the mixture in the presence of a solvent under temperature and pressure conditions wherein the bulk of the solvent is maintained in the liquid phase. In such a process those constituents more readily soluble in the particular solvent used are concentrated in the residue and the remaining constituents are removed as a raffinate fraction. The solvent is separately removed from both the extract and raffinate fractions, the separately recovered portions combined and recycled together to the extraction step.

The separation of the solvent from the respective fractions is, in general, most easily accomplished by distillation, employing plate or packed towers whereby the components are obtained in a relatively pure state. However, in certain cases, such as the system, butanes-acetone, the vapor pressure relationship between the solvent used and the constituent being separated is so abnormal that separation to required purities by distillation is virtually impossible. In such cases, it is necessary to wash the solvent from the constituent with a second solvent, such as water. Furthermore, in certain cases, such as the one mentioned above, when water is used to wash the solvent from the desired component, it has been found that emulsification difficulties occur if the concentration of the solvent in the water layer becomes too great. Thus, it is one important object of this invention to keep the concentration of the solvent in the water layer at a point below which emulsification occurs.

In many cases the hydrocarbon feed to the extraction tower contains a small amount of high boiling materials, particularly if the feed has been obtained from a cracking process wherein a large amount of unsaturated hydrocarbons are formed, subsequently subjected to a sulfuric acid extraction for removal of certain unsaturated constituents. This high boiling material dissolves in many types of solvents used, and consequently is removed from the bottom of the extraction tower along with the desired components in the extract. When these desired components are separated from the solvent, the high boiling material remains dissolved in the solvent and is consequently recycled back to the extraction tower along with the solvent. Thus, it is obvious that the concentration of high boiling material in the solvent being circulated will build up. Such a condition is undesirable both from the standpoint of difficulty of control and because it requires an increase in solvent circulation to offset the bad effect of the high boiling material on the relative volatilities of the components which it is desired to separate.

It has been suggested that the high boiling material might be continually removed from the solvent system by diluting the solvent being recycled with water to precipitate the high boiling material. However, it has been found that in many cases in order to reject a large proportion of the high boiling material present in the solvent, a very large quantity of water is required which in turn increases tremendously the equipment necessary to recover the solvent.

This invention, therefore, has for another of its principal objects to provide for an economical process for separating hydrocarbon mixtures by extractive distillation in the presence of a solvent and under temperature and pressure conditions in which the solvent is maintained essentially in the liquid phase while preventing an increase in concentration of high boiling material in the solvent being recycled.

It is a further object of this invention to provide a method for reducing the amount of equipment necessary for the recovery of the solvent.

A still further object of this invention is to reduce the amount of water required for effecting the removal of the high boiling material from the solvent.

According to the present invention, these and other objects are obtained by mixing a portion of the solvent being recycled with the raffinate stream taken off overhead from the extractive distillation tower and introducing them together into the bottom of the tower in which the solvent is being extracted from the raffinate. In this tower the mixture will be washed by a stream of liquid, such as water, and the bulk of the high boiling material contained in the solvent will be dissolved in the solvent-free raffinate and removed overhead from the wash tower. The amount of water used to extract the solvent from the raffinate will be controlled so that the concentration of the solvent in the water layer is below that at which emulsification occurs.

With reference to the drawing, 1 represents a steam stripper for removing the bulk of the high boiling materials from the feed stock. The purified feed stock is extracted in tower 2 by means of a liquid solvent to yield vapor and liquid fractions which are removed from the top and bottom of the tower respectively. This extractive distillation may be carried out in any known suitable type of fractionating column whether it be a tower filled with a packing of refractory earthware, glass, etc., or a tower constructed in the same manner as an ordinary fractionating column of the bubble cap type. In any case, the feed enters the tower (in vapor form for economy of design) and is passed upwardly thru the liquid phase selective solvent flowing down the tower.

Conditions on each plate of the tower are such that the liquid mixtures of close boiling hydrocarbons and solvent are at their boiling points and are continuously being contacted with vapors boiled from the plates below. Because of the relatively low volatility of the solvent compared with the hydrocarbon constituents, the vapors are relatively poor in the former constituents and rich in the latter. By holding the amount of solvent circulated to the tower constant in definite ratio to the amount of overhead from the tower, the optimum relative volatilities for the separation of the desired hydrocarbons can be secured. Furthermore, by controlling the amount of hydrocarbon reflux and consequently the reflux ratio, the actual degree of separation may be varied until the desired product purity and recovery are obtained. Solvent is recovered from the overhead fraction in tower 3 and from the bottoms fraction in tower 4. Dilute solvent obtained in tower 3 is concentrated in tower 5 and recycled to the extraction tower 2.

The invention will be described in detail as applied to the separation of a mixture of butanes and butenes contained in the $C_4$ fraction obtained by the cracking of a gas oil. Such a $C_4$ fraction contains isobutylene, butene-1, butenes-2, butane, isobutane, and small amounts of diolefins and acetylenes. The isobutylene present in this fraction is an important raw material for the preparation of high molecular weight polymers, synthetic rubber and butyl alcohols. This material is usually removed from the $C_4$ fraction by contacting the fraction with sulfuric acid of the desired concentration whereby substantially only the isobutylene is absorbed in the acid. As a result of acid-treating the $C_4$ fraction in this manner, a portion of the isobuteylene and other olefins present is polymerized and gives rise to the formation of a small amount of a high boiling material which remains dissolved in the remaining hydrocarbons.

A $C_4$ fraction of this type from which the bulk of the isobutylene has been removed and which has, for example, the following composition is suitable as a feed stock for the process according to this invention:

| | Per cent by volume |
|---|---|
| Isobutane | 42.4 |
| Normal butane | 9.4 |
| Isobutylene | 2.0 |
| Butene-1 | 15.0 |
| Butenes-2 | 30.2 |
| High boiling material | 1.0 |

Referring to the drawing, this fraction is introduced by line 6 thru heat exchanger 7 into tower 1 where it is stripped with steam introduced thru line 8. Caustic may also be introduced into this tower thru line 9 to neutralize any sulfuric acid esters which may be present as a residue from acid-treating. The bulk of the high boiling materials is withdrawn from the bottom of tower 1 thru line 10. The hydrocarbons from which most of the high boiling materials are removed are taken overhead thru line 11 and are introduced in the vapor phase into tower 2 where they are subjected to an extractive distillation in the presence of a liquid stream of aqueous acetone introduced thru line 12. The conditions in the tower are such as to cause a distillation of hydrocarbons in the presence of aqueous acetone on each plate of the tower. The aqueous acetone contains 14–17% water. Suitable temperatures range between 120° and 200° F. and pressures between 50 and 150 lbs. In this manner, the butanes and butenes are simultaneously distilled and extracted as they pass thru the acetone. Heat may be supplied to tower 2 by means of reboiler 14. Extract (including solvent) is removed from the bottom of the tower thru line 15 and has the following approximate composition in weight per cent when the extractive distillation tower is operated with 85 weight per cent solvent on the top extraction plate and a cold hydrocarbon reflux ratio (to overhead product) of 6.5:1:

| | Per cent |
|---|---|
| $C_4$ hydrocarbons (95% butenes) | 4.1 |
| Acetone | 78.4 |
| Water | 16.5 |
| High boiling materials | 1.0 |

The extract is then introduced into the top of tower 4 where the butenes are separated from the aqueous acetone using fractionation by distillation in the conventional manner. For example, the bottom of the stripping tower 4 may be reboiled by 16 which may be a fired coil or steam heater, while the top of the tower is refluxed by returning a portion of the solvent-free product butenes removed from the top of the tower thru line 17. These butenes have approximately the composition:

| | Per cent |
|---|---|
| Butene-1 | 26.7 |
| Butenes-2 | 63.5 |
| Isobutane | 1.8 |
| Normal butane | 4.4 |
| Isobutylene | 3.6 |

Aqueous acetone from which all of the $C_4$ hydrocarbons have been removed is taken from tower 4 thru line 18, passed thru heat exchangers 7 and 19 and further treated in a manner to be described hereinafter.

Returning now to the extraction tower 2, the butanes are removed overhead thru line 20 and condensed in condenser 21. The condensate formed has the following composition in weight per cent:

| | Per cent |
|---|---|
| $C_4$ hydrocarbons (92% butanes) | 95 |
| Acetone | 4 |
| Water | 1 |

A portion of this condensate may be returned to the tower thru line 22 as reflux while the remainder is passed thru line 23 and cooler 24 and introduced into the bottom of water wash tower 3. In this tower the acetone is removed from the butane fraction by washing with water introduced at the top of the tower thru line 26. Butanes from which essentially all of the solvent has been removed are taken overhead thru line 27 and are thence conveyed to storage. These butanes have the following approximate composition, exclusive of the high boiling material to be described hereinafter:

| | Per cent |
|---|---|
| Isobutane | 78.0 |
| Normal butane | 13.9 |
| Isobutylene | 0.6 |
| Butene-1 | 5.9 |
| Butenes-2 | 1.6 |

The washing of the butane fraction with water as carried out in this tower is accompanied by severe emulsification unless the concentration of acetone in the water at all times is less than 15%. It is therefore necessary to adjust the amount of water introduced thru line 26 so that the acetone concentration in the water phase is at all times less than 15%.

Aqueous acetone accumulates in the bottom of water wash tower 3 and is removed thru line 28, passed thru heat exchanger 19, and introduced into the top of tower 5 where the acetone is concentrated to a point where it is suitable for use as a solvent in the extractive distillation tower 2. The thus concentrated acetone, usually a mixture of 83 weight per cent acetone and 17% water, is removed overhead from tower 5 thru line 28 and condensed in condenser 29. A part of the condensed acetone may be returned to tower 5 as reflux and the remainder is removed thru line 31 and combined with the acetone from the bottom of tower 4. This combined stream of acetone is then recycled to the extraction tower 2 thru line 32.

The acetone recovered from the butene fraction in tower 4 contains a small amount of high boiling material which was removed from the feed to the extraction tower 2 as explained above. It also contains a small amount of additional high boiling hydrocarbons which form during the operation of the process by virtue of the polymerization of olefins present. It is obvious if the acetone containing the high boiling material is allowed to circulate continuously that the amount of high boiling hydrocarbons in the acetone will continually increase and finally overload the system.

According to this invention, the high boiling material is prevented from building up in the circulating acetone by bleeding off a portion of the acetone being recycled in line 32 and introducing it thru line 33 into the butane stream being removed from the top of extraction tower 2 into the bottom of water wash tower 3. In this tower, during the extraction of the acetone from the liquid butanes by means of the water, the high boiling hydrocarbons dissolve in the butane and are removed along with the butane to storage thru line 27. Thus, a portion of the high boiling hydrocarbons contained in the circulating acetone is being continually removed along with the butanes to storage.

The nature and objects of the present invention having thus been set forth and a specific illustrative embodiment of the same given, what is claimed as new and useful and desired to be secured by Letters Patent is:

1. In a process for separating a mixture of butanes and butenes comprising fractionating the mixture in the presence of acetone under such temperature and pressure conditions that the acetone remains substantially in the liquid phase to obtain a vapor fraction comprising a major proportion of butanes and a minor proportion of acetone and a liquid fraction comprising butenes and the bulk of the acetone, condensing said vapor fraction, separately removing the acetone from each fraction, and combining and recycling the acetone thus separated, the improvement comprising adding a portion of said recycled acetone stream to said condensed vapor fraction prior to the removal of the acetone therefrom and extracting the acetone from the condensed vapor fraction with water.

2. In a continuous process for the separation of a mixture of butanes, butenes and high boiling hydrocarbons by distillation in the presence of acetone under such temperature and pressure conditions that the acetone remains substantially in the liquid phase wherein butanes are recovered as a vapor fraction and butenes and acetone as liquid fraction and wherein the high boiling hydrocarbons are recovered from the liquid fraction along with the acetone, the step of removing high boiling hydrocarbons from the acetone comprising condensing the vapor fraction and adding a portion of the acetone-hydrocarbon mixture recovered from the liquid fraction to the condensed vapor fraction containing the butanes and recovering the acetone from the vapor fraction by extracting with water whereby the high boiling hydrocarbons dissolve in the butanes and acetone essentially free from high boiling hydrocarbons is obtained.

3. Process according to claim 2 in which the condensed vapor fraction is extracted with sufficient water so that at all times there is less than 15% acetone in the water phase.

4. In a process which comprises contacting a gaseous mixture containing a butylene and a butane with an aqueous acetone solvent to produce a solution of the butylene in the aqueous acetone solvent, which solution after separation from the residual mixture is subsequently treated to recover the butylene therefrom and to produce a regenerated acetone solvent, the improvement which comprises subjecting the residual mixture to condensation conditions to form a condensed liquid, passing at least a portion of said condensed liquid and at least a part of the regenerated solvent produced upon recovery of the butylene into a scrubbing zone, scrubbing the said liquid and the regenerated solvent passed into said zone with water to separate hydrocarbon material therefrom and to produce a dilute aqueous solution of acetone, concentrating the dilute aqueous solution of acetone to an acetone concentration substantially equivalent to the acetone concentration of the aqueous acetone solvent employed to produce the solution of the butylene, and employing the concentrated solution of extract additional quantities of the butylene.

5. A process for separating a mixture containing butenes, butanes and high boiling hydrocarbons comprising distilling said hydrocarbon mixture in the presence of acetone, recovering a distillate fraction richer in said butanes together with a minor proportion of said acetone, recovering a major proportion of the acetone richer in the butenes and high boiling hydrocarbons as a bottoms product, distilling the bottoms product to recover the acetone and high boiling hydrocarbons, adding at least a portion of the acetone and high boiling hydrocarbons recovered from the bottoms product to the distillate fraction prior to recovering any acetone therefrom and then washing the distillate fraction with water to recover acetone free from high boiling hydrocarbons.

JOHN D. LONG.

REFERENCES CITED

The following references are of record in the file of this patent:

UNITED STATES PATENTS

| Number | Name | Date |
|---|---|---|
| 1,612,164 | Van Nuys | Dec. 28, 1926 |
| 1,850,836 | Guinot | Mar. 22, 1932 |
| 1,870,854 | Lewis | Aug. 9, 1932 |
| 1,937,786 | Ricard et al. | Dec. 5, 1933 |
| 2,205,996 | Van Wijk | June 25, 1940 |
| 2,290,636 | Deanesly | July 21, 1942 |
| 2,302,319 | Henry et al. | Nov. 17, 1942 |
| 2,312,912 | Kiersted | Mar. 2, 1943 |
| 2,316,860 | Guinot | Apr. 20, 1943 |
| 2,320,461 | Murray et al. | June 1, 1943 |
| 2,377,049 | Souders | May 29, 1945 |